United States Patent [19]
Andersson et al.

[11] Patent Number: 5,717,714
[45] Date of Patent: Feb. 10, 1998

[54] INTER-REPEATER BACKPLANE WITH MIXED SIGNAL STATE MACHINE INTERCONNECT

[75] Inventors: Ralph E. Andersson, Grass Valley; Joseph E. Heideman, Orangevale; David T. Chan, Fair Oaks; Haim Shafir, Sacramento; Stefan M. Wurster, Livermore; David S. Wong, Campbell, all of Calif.

[73] Assignee: Level One Communications, Inc., Sacramento, Calif.

[21] Appl. No.: 379,903

[22] Filed: Jan. 30, 1995

[51] Int. Cl.$^6$ .......................... H04B 17/02; H04L 12/26
[52] U.S. Cl. .......................... 375/213; 370/243; 370/425; 370/446
[58] Field of Search .......................... 375/211, 213; 370/423, 425, 446, 492, 501, 242–243, 246–249, 445, 447; 359/174, 177

[56] References Cited

U.S. PATENT DOCUMENTS

| | | | |
|---|---|---|---|
| 4,939,747 | 7/1990 | Adler | 375/213 |
| 5,265,123 | 11/1993 | Vijeh et al. | 375/213 X |
| 5,517,520 | 5/1996 | Chi | 375/211 X |
| 5,574,726 | 11/1996 | Chan et al. | 375/221 X |

*Primary Examiner*—Young T. Tse
*Attorney, Agent, or Firm*—Merchant, Gould, Smith, Edell, Welter & Schmidt, P.A.

[57] ABSTRACT

An inter-repeater backplane employs both analog and digital circuitry to convey state machine information to adjacent repeaters thereby allowing seamless integration of multiple repeaters into a single hub without requiring additional drivers or external glue logic. A data path allows the passage of data between multiple repeaters on the inter-repeater backplane and an inter-repeater backplane enable allows individual repeaters to take control of the inter-repeater backplane data bus. An inter-repeater backplane driver enables external bus drivers which may be required in synchronous systems with large backplanes. An inter-repeater backplane clock is used to synchronize multiple repeaters on the inter-repeater backplane. Only two leads (IRCOL and IRCFS) are used to provide transmit and receive collision information. These two leads in conjunction with IRENA also indicate which repeater is receiving data. The transmit and receive collision information is presented on the backplane in a manner that is both analog and digital in nature.

13 Claims, 3 Drawing Sheets

INTER-REPEATER BACKPLANE WITH MIXED SIGNAL STATE MACHINE INTERCONNECT

CROSS-REFERENCE TO RELATED APPLICATIONS

This application is related to:

Application Ser. No. 08/379,907, entitled "Inter-Repeater Backplane With Synchronous/Asynchronous Dual Mode Operation," filed on same date herewith by R. Andersson et al., and assigned to the assignee of this application;

Application Ser. No. 08/380,651, now U.S. Pat. No. 5,574,726, entitled "Inter-Repeater Backplane," filed on same date herewith by D. Chan et al., and assigned to the assignee of this application; and Application Ser. No. 08/380,074, entitled "Inter-Repeater Backplane For Allowing Hot-Swapping Of Individual Repeater Circuits," filed on same date herewith by D. Chan et al., and assigned to the assignee of this application.

All of the above-identified applications are incorporated by reference herein.

BACKGROUND OF THE INVENTION

1. Field of the Invention

This invention relates in general to a multi-media multi-port hub inter-repeater backplane, and more particularly, to an inter-repeater backplane that employs both analog and digital circuitry to convey state machine information to adjacent repeaters thereby allowing seamless integration of multiple repeaters into a single hub.

2. Description of Related Art

The communications industry has experienced phenomenal growth over the past several years. Much of this growth has occurred in the area of telecommunications involving computers and computer generated or stored data. The exchange of messages and data has been facilitated by the advent of local and metropolitan area networks. Remotely located computer users communicate over the local and metropolitan area networks to access data and to communicate with other remote computer users.

In such networks, nodes are connected to a bus and have multiple, or concurrent access to the communications medium. However, a control technique is used to allow access to the communication medium and to resolve contention between the various users. Typically, a carrier sense, multiple access with collision detection (CSMA/CD) scheme is used. With CSMA/CD a node listens for activity and begins sending message packets when the node determines that no activity is occurring over the network. Sometimes simultaneous transmission by multiple nodes occurs. This results in collisions between the different message packets. When a node detects a collision, a signal is sent over the network to the other transmitting nodes. The affected nodes terminate their transmissions and probabilistically reschedule their next attempt to transmit.

The standard for Local and Metropolitan Area Network technologies is governed by IEEE Std. 802-1991. IEEE Std. 802-1991 describes the relationship among the family of 802 standards and their relationship to the ISO Open System Interconnection Basic Reference Model and is herein incorporated by reference. IEEE Std. 802.3-1991 defines the standards for a bus utilizing collision sense multiple access/collision detection (CSMA/CD) as a data link access method and is herein also incorporated by reference.

Typically, unshielded twisted pair cables or existing telephone wiring is used as the transmission medium to provide an economical solution to networking. However, the attenuation of signals transmitted over unshielded twisted pair cables increases as the distance between data terminal equipment becomes greater. Thus, repeaters are inserted in the twisted pair cables to facilitate greater distances.

In the past, repeaters were limited to a fixed number of ports thereby limiting the number of data channels. Accordingly, repeater manufacturers designed hardware which could be cascaded so that multiple repeater circuits could be integrated into a single hub. In order to allow multiple repeater circuits in a system to behave as a single hub, the repeaters must pass some state information in addition to routing data and clock signals. The state machine information is passed between individual repeater circuits over an inter-repeater communication medium or backplane. Further, there are two critical state variables which must be passed between the repeater circuits to implement a multiple "chip" hub. The first condition is when only one port remains in collision after the hub has gone into transmit collision mode (PORTM). The second variable is the specific port of a hub receiving data (PORTN). In addition to these critical variables, specific state information must be passed between the repeater chips as well. These states are transmit and receive collision.

The Am79C981 device integrates repeater functions specified by Section 9 of the IEEE 802.3 Standard and twisted-pair transceiver functions complying with the 10Base T standard. The Am79C981 provides eight integral twisted-pair medium attachment units and an attachment unit interface port. The Am79C981 device provides expansion capabilities for increasing the total number of ports per repeater by connecting multiple Am79C981 devices through their expansion ports. The expansion port is comprised of five pins. Two of the five pins are for the bidirectional signals DAT and JAM. Two of the three remaining pins are for input signals ACK(bar) and COL(bar). The fifth pin of the expansion port is for output signal REQ(bar).

The DAT pin is a bidirectional I/O pin which can be used to transfer data between Am79C981 devices in a multiple chip design. The data sent over the DAT line is in a NRZ (non-return-to-zero) format and is synchronized to the common clock. The JAM pin is another bidirectional I/O pin that is used by the active Am79C981 chip to communicate its internal status to the remaining (inactive) Am79C981 devices. When JAM is asserted HIGH, it indicates that the active Am79C981 device has detected a collision condition and is generating a JAM sequence. During the time when JAM is asserted HIGH, the DAT line is used to indicate whether the active Am79C981 chip is detecting collision on one port only or on more than one port. When DAT is driven HIGH by the Am79C981 device (while JAM is asserted by the Am79C981 device), then the active Am79C981 device is detecting a collision condition on one port only. The "one-port-left" signal is necessary for a multiple Am79C981 device repeater to function correctly as a single multi-port repeater unit.

When multiple Am79C981 devices are cascaded, they must be clocked synchronously with the common clock connected to the input of all the Am79C981 devices. Furthermore, the Reset must also be synchronized to this clock.

The arbitration for access to the bussed bi-directional signals (DAT and JAM) is provided by one output (REQ (bar)) and two inputs (ACK(bar) and COL(bar)). The Am79C981 asserts the REQ pin to indicate that it is active and wishes to drive the DAT and JAM pins.

Most importantly, the Am79C981 requires an external arbiter which senses the direct lines from all of the Am79C981 devices and asserts the ACK(bar) when one and only one Am79C981 device is asserting its REQ(bar) line. If more than one Am79C981 circuit asserts its REQ line, the arbiter must assert the COL signal thereby indicating that more than one Am79C981 device is active. A collision condition occurs when more than one Am79C981 device is active. Under collision conditions, all the Am79C981 devices are notified of this occurrence by the COL(bar) signal line.

In summary, the Am79C981 device uses a communication scheme wherein two digital pins DAT and JAM) signal the "one port left" (PORTM) condition. However PORTM and collision event information is not transmitted to the other repeaters and thus the Am79C981 requires external arbitrational logic.

Another example of an integrated multi-port repeater device is the AT&T T7202 Smart Hub Controller and the T7201 Multi-Port Repeater (SHC and MPR2 respectively). The AT&T repeater uses a digital pin called ACTIVE to pass PORTM information to other "chips" in the hub. However, the interconnect between individual repeater devices is not direct. The AT&T repeater device requires an external state machine implemented in discrete logic to pass collision and PORTM ("one port left state") information. PORTN information is also passed to other chips using the ACTIVE pin.

Still another method of implementing an integrated multi-port repeater is National Semiconductor's DP83950A Repeater Interface Controller and DP83955 /DP83956 Lite End Repeater Interface Controller devices (RIC and LERIC respectively). The National Semiconductor RIC and LERIC devices use three digital pins ACKI, ACKO, and ACTN to ascertain whether what port is receiving data and whether the "one port left state" occurs. In addition to ACKI, ACKO, and ACTN, the indication of collision state information requires two additional digital pins, ANYXN and COLN. Pins ACTN and ANYXN both have a sense and drive component thereby comprising a total of four functions. In the case of small configurations, the RIC device's can be connected directly. For larger systems the RIC device runs into problems with its port arbitration scheme. If a system backplane is used with each RIC placed on a plug-in PC board, the user is forced to use external logic to perform arbitration. The alternative is daisy chained arbitration which will disable all the ports lower in the chain if a board is removed.

There is a need, therefore, for an inter-repeater backplane that allows seamless integration of adjacent repeaters into a single hub. There is also a need for an inter-repeater backplane which does not require additional drivers or external glue logic to implement a multiple board system design. Further, there is a need for a inter-repeater backplane that conveys state machine information which results in greater ease of use and which eliminates the system limitations imposed upon the user by prior multi-port repeater single hub implementations.

SUMMARY OF THE INVENTION

To overcome the limitations in the prior art described above, and to overcome other limitations that will become apparent upon reading and understanding the present specification, the present invention discloses an inter-repeater backplane that employs both analog and digital circuitry to convey state machine information to adjacent repeaters thereby allowing seamless integration of multiple repeaters into a single hub.

The present invention solves the above-described problems by providing an inter-repeater backplane which allows repeaters to be connected together and operate as a single hub without additional drivers or external glue logic.

To allow multiple chips in a system to behave as a single hub requires that some state machine information be passed between them. Two of the critical state variables which must be passed to build multiple chip hubs are PORTM and PORTN. The condition where only one port remains in collision after the hub has gone into transmit collision is called PORTM. The port of a hub receiving data is known as PORTN. In addition to these variables, specific state information must be passed as well. These states are transmit and receive collision.

A system in accordance with the principles of the present invention includes a bus having an analog voltage level for communicating electrical signals between repeaters coupled to the bus; detection means for determining when a repeater receives data; a current sinking means for reducing the voltage level of the bus in response to repeaters receiving data; means for measuring the analog voltage of the bus and for comparing the measured bus voltage to a preset threshold; and control means for jamming the repeaters in response to the bus voltage being less than the preset threshold.

One aspect of the present invention is only two pins are used to encode PORTN, PORTM, and collision state information in a format that allows parallel repeater devices to determine the correct placement within the repeater state machine. The unique feature to this approach is that this information is presented on the backplane in a manner that is both analog and digital in nature.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an inter-repeater backplane which allows multiple repeaters to operate as a single hub. According to the present invention, repeaters are linked via an inter-repeater backplane which employs both analog and digital circuitry to convey state machine information. Thus, the inter-repeater backplane of the present invention allows seamless integration at the system level because the repeaters themselves require no additional drivers or external glue logic to implement a multiple board system design.

Figure 1:
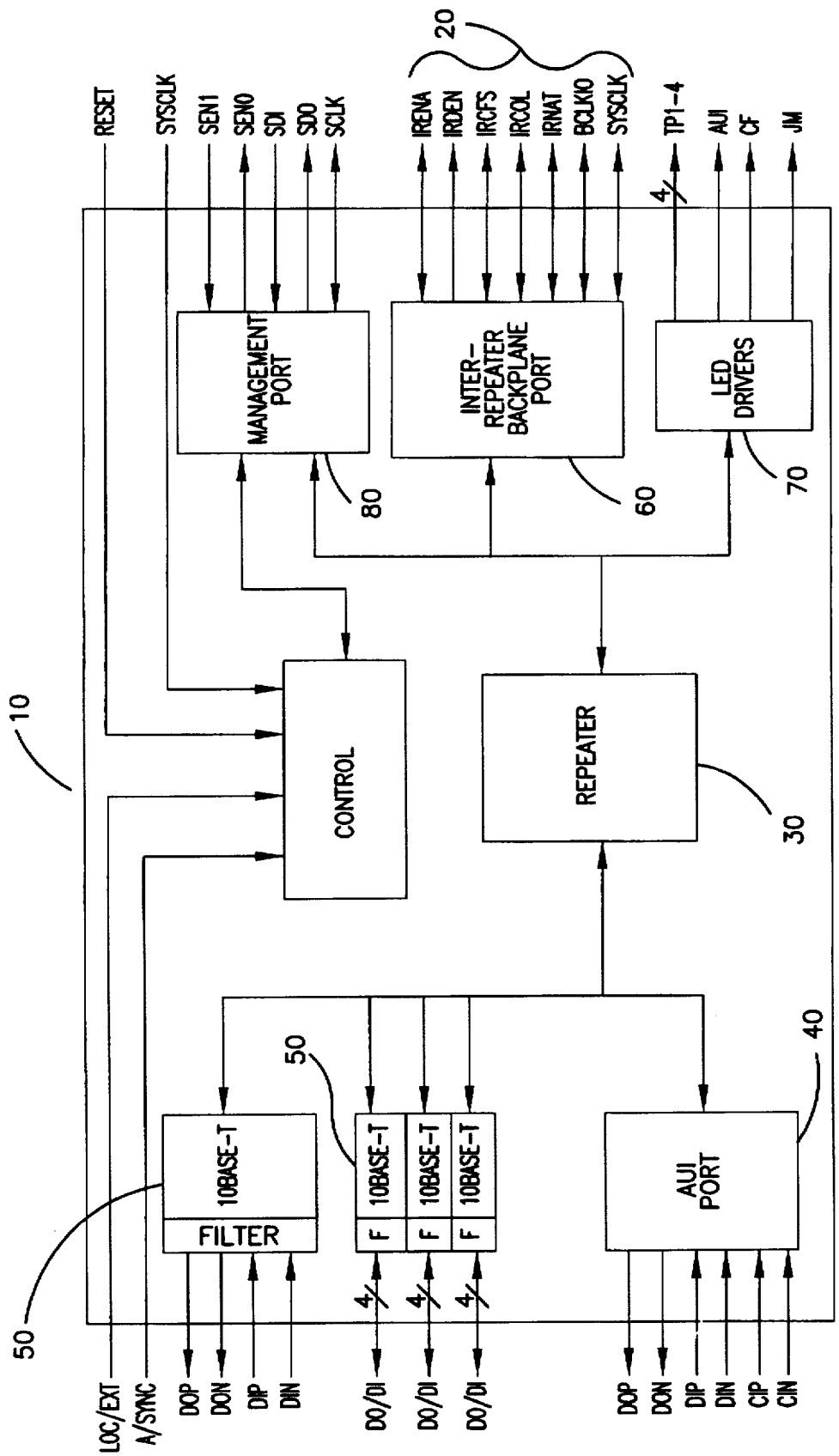
FIG. 1 is a system diagram of an exemplary repeater which can be cascaded together in accordance with the inter-repeater backplane of the present invention.

For a better understanding of the present invention, FIG. 1 illustrates an exemplary integrated hub repeater 10 for 10Base-T networks which may be combined via an inter-repeater backplane 20 according to the present invention. Typically, repeaters include a global repeater state machine, several timers and counters and a timing recovery circuit 30. The repeater may also include at least one Attachment Unit Interface (AUI) port 40 and a plurality of 10Base-T transceiver ports 50. AUI ports 40 are utilized to connect the repeater to other external transceivers (e.g. 10Base-2, 10Base-5, 10Base-T, or FOIRL) or to a drop cable.

According to the present invention, repeaters are connected to an inter-repeater backplane by way of an inter-repeater backplane expansion port 60. The inter-repeater backplane expansion port 60 facilitates the interconnection of a large number of 10Base-T ports 50 into an integrated single repeater hub. Further, LED's may be connected to the repeater unit to indicate status of the repeater and may be driven by LED drivers 70. Finally, a network management port 80 may be provided to facilitate network management and statistic gathering by an external management device or software.

Figure 2:
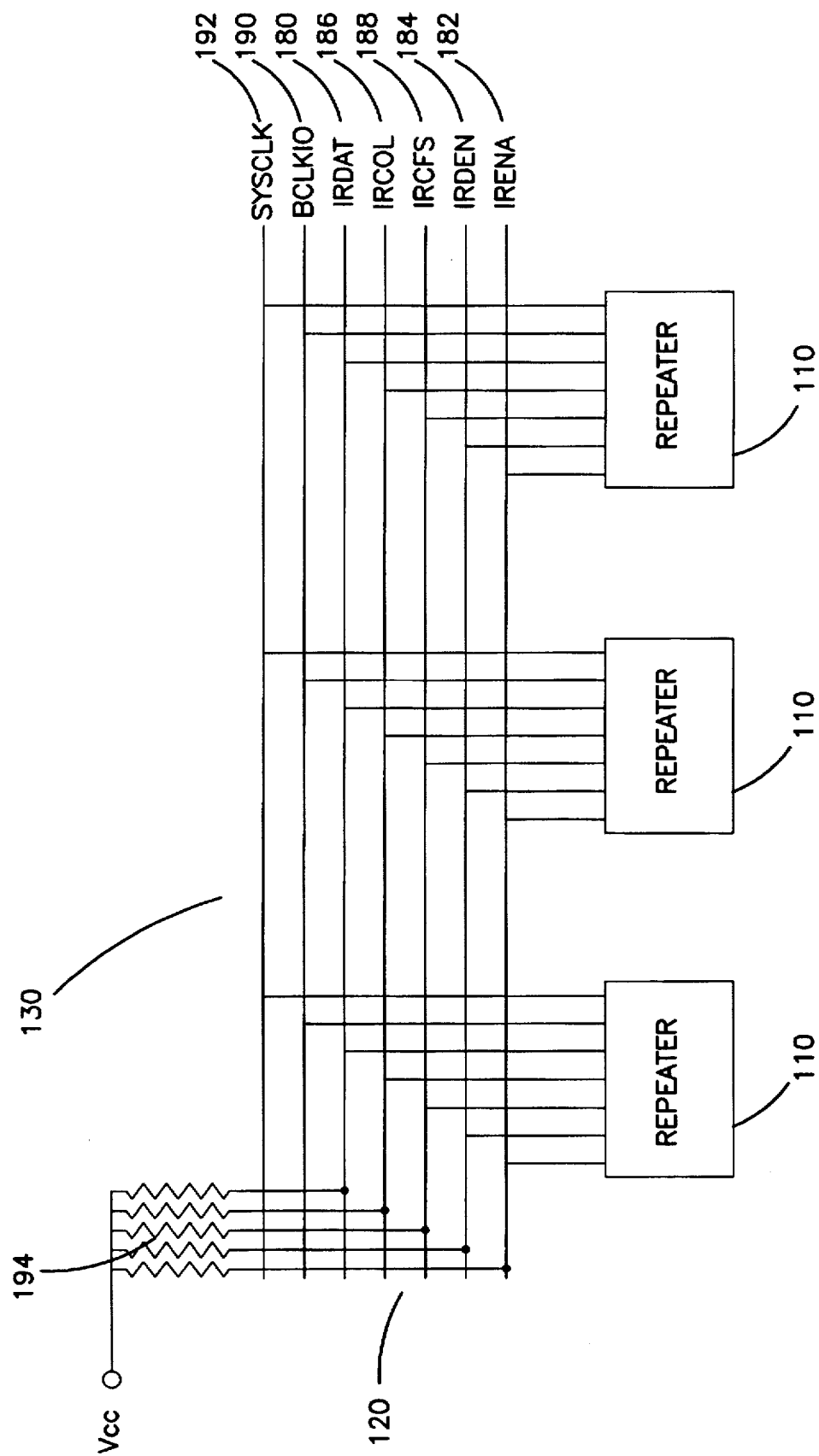
FIG. 2 is a block diagram of repeaters integrated into a single hub via the inter-repeater backplane.

FIG. 2 illustrates several multi-port repeaters 110 connected together to link several 10Base-T ports together via the inter-repeater backplane 120, according to the present invention, to form a single hub 130. The inter-repeater backplane 120 provides the communication medium between each repeater 110. By way of collision signaling on the inter-repeater backplane, all connected repeaters share collision parameters, thereby acting as a single large repeater.

The inter-repeater backplane accommodates seven signals, i.e. IRDAT 180, IRENA 182, IRDEN 184, IRCOL 186, IRCFS 188, BCLKIO 190 and SYSCLK 192. IRDAT 180 is the inter-repeater backplane data path which allows the passage of data between multiple repeaters 110 on the inter-repeater backplane 120. IRENA 182 is the inter-repeater backplane enable which allows individual repeaters 110 to take control of the inter-repeater backplane data bus 180. IRDEN 184 is the inter-repeater backplane driver enable which is used to enable external bus drivers which may be required in synchronous systems with large backplanes. IRDEN 184 is an active low signal which is maintained for the duration of the data transmission.

BCLKIO 190 is the inter-repeater backplane clock. The backplane clock 190 is used to synchronize multiple repeaters 110 on the inter-repeater backplane 120. In the asynchronous mode, BCLKIO 190 is supplied only when a repeater 110 is outputting data to the bus 120. Each repeater 110 outputs its internally recovered clock when it takes control of the bus 120. Other repeaters 110 on the backplane 120 then rate adapt with a FIFO (to BCLKIO 190) for the duration of the transmission. In synchronous mode, BCLKIO 190 must be supplied to all repeaters 110 from a common external source.

SYSCLK 192 is the system clock. For both synchronous and asynchronous mode, the system clock is distributed over the backplane from a central source. In synchronous mode, BCLKIO 190 is derived from SYSCLK 192.

The inter-repeater backplane 120, according to the present invention, provides collision signalling via a mixed signal state machine interconnect. Collision signaling, according to the present invention utilizes both analog and digital circuitry to convey state machine information to adjacent chips. The collision signaling is handled by IRCOL 186 and IRCFS 188. IRCOL 186 signals collisions and IRCFS 188 is the inter-repeater backplane collision force sense. IRCOL 186 is a digital open-drain whereas IRCFS 188 is an analog/digital signal.

All backplane signals except for BCLKIO 190 and SYSCLK 192 are open drain and therefore require pullup resistors. Open drain drivers are required to prevent contention since multiple repeaters will simultaneously be driving, in collision, IRCOL 186 and IRCFS 188, or attempting to drive IRDAT 180, IRENA 182, IRDEN 184 when two repeaters receive data at exactly the same time. All hubs 130 in the system monitor the bidirectional pin, IRCFS 188 and IRCOL 186, for transmit collision, PORTM ("one port left state") and IRENA 182 for PORTN (the specific port of a hub receiving data) information. The hub that receives a packet will control the backplane signalling.

The repeater receiving data will pull IRENA 182 low. In addition, that repeater will pull current (approximately 7 milliamps) through the external pullup resistor. This will create a voltage at IRCFS 188 which is approximately one-half of $V_{cc}$. The voltage which is sensed (or scanned) at IRCFS 188 is one-third of $V_{cc}$. If two repeaters receive data at the same time, they will both pull IRENA 182 low and will both pull current through IRCFS 188. When this occurs, IRCFS 188 will be below the threshold and transmit collision is entered. If only one repeater is receiving data, IRENA 182 lets other repeaters in the hub know PORTN has been assigned and deters control of the backplane.

Figure 3:
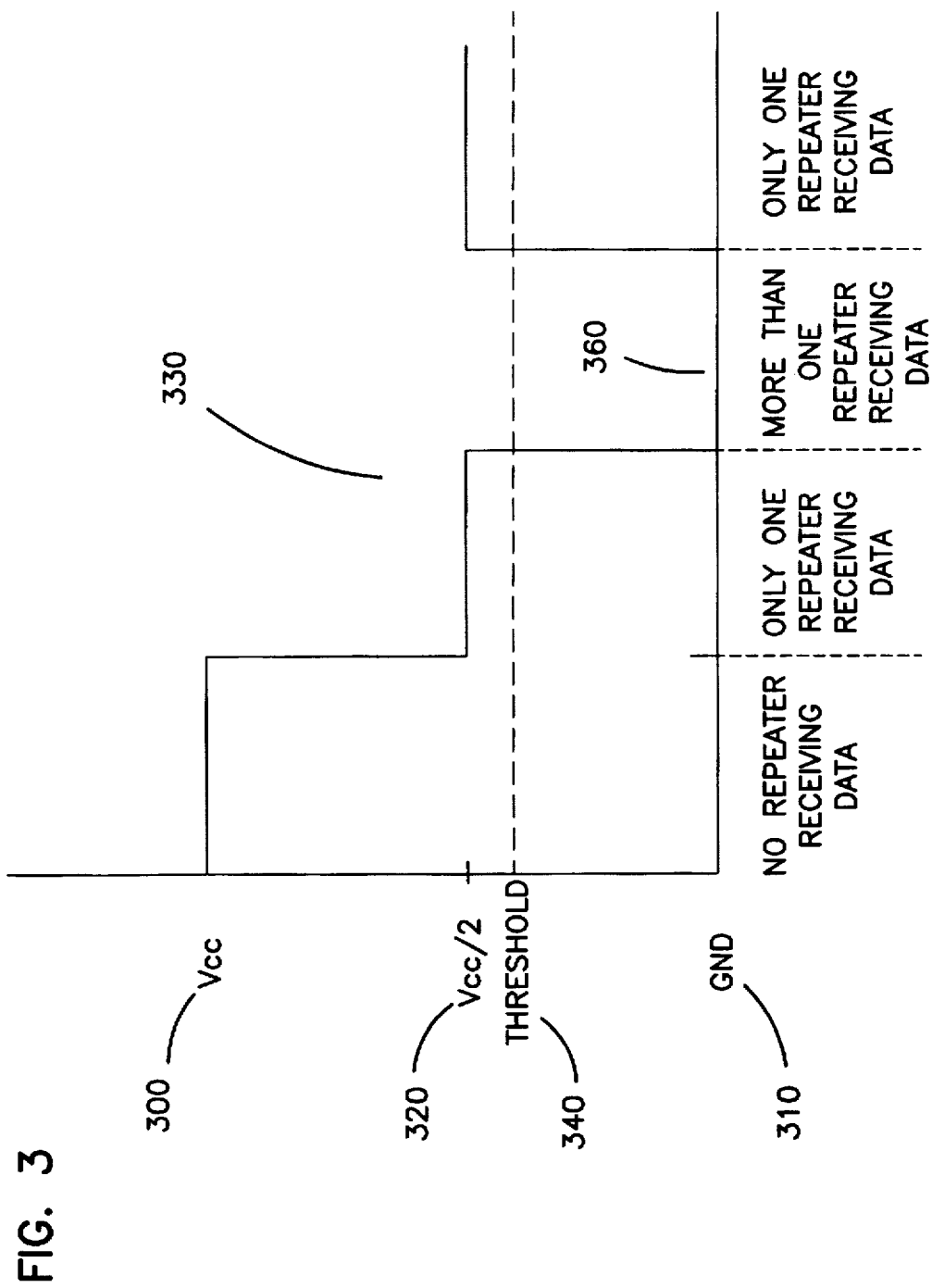
FIG. 3 is a graph of the collision force sense voltage conveyed over the inter-repeater backplane.

Referring to FIG. 3, the voltage level on the IRCFS interconnect is always at one of three values: power source level 300, ground 310 and an intermediate level 320. The signal detected on the mixed signal state machine interconnect conveys whether a collision has occurred according to the magnitude of the detected analog voltage level 330.

Now referring both to FIG. 2 and FIG. 3, IRCFS 188 sinks a controlled amount of current through the external pull-up resistor 194 which is common to all repeaters 110 in the system to attain a voltage intermediate to power 300 and ground 310. The external resistor 194 is chosen so that two constraints are met. A hub 130 will drive IRCFS 188 low 360 if it detects a transmit collision but IRCFS 188 will otherwise remain in the intermediate range 320 when data is being received by any single repeater 110 on the bus 120.

The IRCFS 188 voltage level 330 is initially at the power source level 300. When a single repeater 110 receives data, the IRCFS 188 voltage level 330 falls below the initial IRCFS 188 voltage level 300 due to the voltage drop across the global pull-up resister 194. However, this intermediate IRCFS 188 voltage level 320 remains sufficiently high so as to be perceived as approximately a TTL logic high to other repeaters 110 in the hub 130. Threshold monitoring is performed by a comparator having its threshold set at one-third of $V_{cc}$. This voltage is approximately the same as that of a TTL high.

If a second repeater 110 receives a packet of data at the same time, the second repeater 110 will also sink the same amount of current through the external pull-up resistor 194. This will cause the IRCFS 188 voltage 330 to drop below a predetermined threshold 340 such as a TTL logic low. This condition informs all other repeaters 110 in the hub 130 that a transmit collision state 360 has been entered. This state 360 will exist as long as more than one repeater 110 is receiving data or for 96 bits, whichever is longer. IEEE 802.3 Repeater State Diagram mandates that collision be maintained for 96 bit times (9.6 microseconds).

Thus, as an input, the hub 130 implements an analog threshold sensing scheme to allow a hub 130 to detect when multiple repeaters 110 are receiving data simultaneously. By comparing the voltage level 330 of the IRCFS bus 188 with a predetermined threshold level 340, transmit collision can be detected. As an output, IRCFS 188 is driven to an intermediate voltage 320 by the repeater 110 receiving data to signify to other repeaters 110 that a repeater 110 is receiving data. IRCFS 188 in conjunction with the digital pin, IRCOL 186, is used to indicate this PORTM (only one repeater remains in collision) condition after the system has gone into a transmit collision state 360.

The identification of the port receiving data (PORTN) is established internally within that receiving chip. PORTN is conveyed to the other repeaters in the hub by virtue of the fact that the data framing signal, IRENA 182, was pulled low by the repeater 110 receiving data.

The inter-repeater backplane also conveys receive collision state information. Receive collision is a collision which occurs on the port designated as PORTN. On the inter-repeater backplane, receive collision is distinguished from transmit collision by virtue of the fact that IRCFS 188 is not pulled to ground. Only the port in collision is sinking the current and thus the threshold is not crossed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An inter-repeater backplane with mixed signal machine interconnect, comprising:

a data path, coupled between a plurality of repeaters, for passing data between multiple repeaters;

an enable signal path, parallel to the data path, for indicating whether a repeater may transmit data over the data path;

a collision signaling path, coupled between the plurality of repeaters, for conveying data path status information utilizing an analog voltage signal, the analog voltage signal indicating whether more than one repeater is receiving data according to a level of the analog voltage signal; and the plurality of repeaters, operatively coupled to the data path, the enable path and the collision signaling path, each of the repeaters comprising a mixed signal state machine that causes current to be sunk through the collision signaling path when a repeater is receiving data, wherein a first quantity of current is sunk through the collision signaling path when data is being received over the data path by one of the repeaters and a second quantity of current is sunk through the collision signaling path when data is being received over the data path by more than one of the repeaters.

2. The inter-repeater backplane of claim 1 wherein the mixed signal state machines monitor the collision signal path to determined whether the data path is being used by identifying a first state where the first quantity of current being sunk induces a first voltage level on the collision signal path and whether a collision has occurred over the data path by identifying a second state where the second quantity of current being sunk induces a second voltage level on the collision signaling path.

3. The inter-repeater backplane of claim 2, wherein the first voltage level is higher than the second voltage level.

4. The inter-repeater backplane of claim 1 wherein the enable path provides a signal indicating the availability of the data path to the state machines.

5. The inter-repeater backplane of claim 1, wherein the mixed signal state machines cause current to be sunk through the collision signal path by sinking a predetermined amount of current through a resister coupled to the collision signal path.

6. An inter-repeater backplane with mixed signal machine interconnect, comprising:

an enable signal path for indicating whether a repeater is receiving data;

a collision signaling path for providing a three level analog voltage signal for indicating whether more than one repeater is receiving data; and a repeater device, operatively coupled to the enable signal path and the collision signaling path, for sinking the voltage level of the collision signaling path when a repeater is receiving a signal, sensing the three level analog voltage signal and jamming a bus in response to the three level analog voltage on the collision signaling path sinks below a predetermined threshold.

7. The inter-repeater backplane of claim 6 wherein the repeater device sinks the voltage level of the collision signaling path by drawing a current therefrom.

8. The inter-repeater backplane of claim 7 further comprising a resister coupled to the collision signaling path for providing a voltage drop thereacross when the repeater device sinks the current from the collision signaling path.

9. The inter-repeater backplane of claim 6, wherein the repeater device reduces the voltage of the analog line to an intermediate analog voltage when only one repeater is receiving data.

10. The inter-repeater backplane of claim 6, wherein the repeater device reduces the voltage of the analog line to a voltage below the threshold when more than one repeater is receiving data.

11. A method of signaling collisions on an inter-repeater backplane, comprising the steps of:

determining when data is being received on a data path;

sinking an amount of current through a collision signaling path proportional to a number of repeaters receiving data, the current reducing a voltage level on the collision signaling path; and sensing the voltage of the collision signaling path to determine whether more than one repeater is receiving data.

12. A method of communicating state information between repeaters connected to an inter-repeater backplane, the method comprising:

sinking a first quantity of current through a collision signaling path of the inter-repeater backplane to cause a first voltage level on the collision signaling path when only one device is receiving data over a data path;

sinking a second quantity of current through the collision signaling path to cause a second voltage level on the collision signaling path when more than one device is receiving data over the data path; and sensing the voltage of the collision signaling path to determine whether more than one repeater is receiving data.

13. The method of claim 12 further comprising the step of indicating a collision when more than one repeater is determined to be receiving data.

* * * * *

UNITED STATES PATENT AND TRADEMARK OFFICE
CERTIFICATE OF CORRECTION

PATENT NO. : 5,717,714

DATED : February 10, 1998

INVENTOR(S) : Andersson et al.

It is certified that error appears in the above-identified patent and that said Letters Patent is hereby corrected as shown below:

Cover Page, Section [56] References Cited, insert the following references:

| | | |
|---|---|---|
| 4,063,220 | 12/13/1977 | Metcalf et al. |
| 4,099,024 | 07/04/1978 | Boggs et al. |

AT&T Microelectronics, T7202 Smart Hub Controller (SHC), Preliminary Data Sheet, September 1992, entire document.

AT&T T7201 Multi-Port Repeater Unit (MPR2), Preliminary Data Sheet, June 199( entire document.

Micro Linear, 10BASE-T Transceiver for Multi-Port Repeaters, Advance Information, September 1989, pp. 1-10.

Advanced Micro Devices, Am79C981 Integrated Multiport Repeater Plus (IMR+), Preliminary, February 1993, entire document.

National Semiconductor, DP83950A Repeater Interface Controller (RIC), Preliminary, September 1991, entire document.

National Semiconductor, DP83950A/DP83956 LitE End Repeater Interface Controller (LERIC), Preliminary, May 1992, entire document.

AT&T, T7240 Twisted-Pair Port Transceiver (TPORT) Issue 2, Advance Data Shee (DRAFT), 1989, entire document.

UNITED STATES PATENT AND TRADEMARK OFFICE
CERTIFICATE OF CORRECTION

PATENT NO. :   5,717,714

DATED       :   FEBRUARY 10, 1998

INVENTOR(S) :   ANDERSSON ET AL.

It is certified that error appears in the above-identified patent and that said Letters Patent is hereby corrected as shown below:

Column 3, line 12, "DAT and JAM)" should read —(DAT and JAM)—.

Signed and Sealed this

Second Day of February, 1999

Attest:

Attesting Officer

*Acting Commissioner of Patents and Trademarks*